Figure 1:
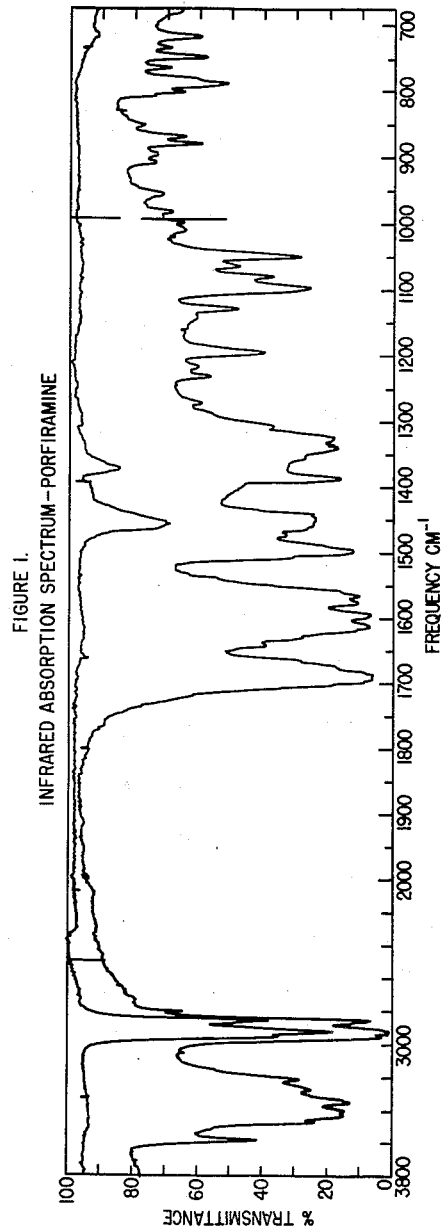

Sept. 8, 1964
W. SCHROEDER
3,148,117
PORFIRAMINE AND METHOD OF PRODUCTION

Filed May 21, 1962
2 Sheets-Sheet 1

INFRARED ABSORPTION SPECTRUM—PORFIRAMINE

WM. SCHROEDER
INVENTOR.
BY
ATTORNEYS

Sept. 8, 1964
W. SCHROEDER
3,148,117
PORFIRAMINE AND METHOD OF PRODUCTION
Filed May 21, 1962
2 Sheets-Sheet 2
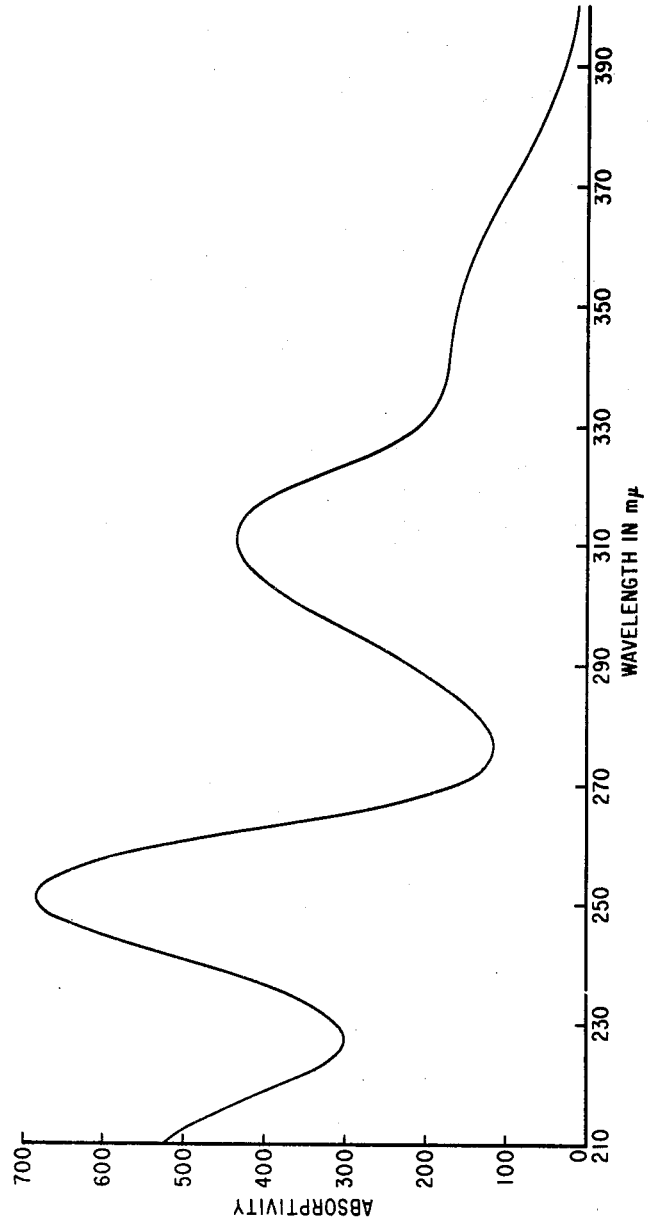
WM. SCHROEDER
INVENTOR.
BY
ATTORNEYS

United States Patent Office 3,148,117
Patented Sept. 8, 1964

3,148,117
PORFIRAMINE AND METHOD OF PRODUCTION
William Schroeder, Scotts, Mich., assignor to The Upjohn Company, Kalamazoo, Mich., a corporation of Delaware
Filed May 21, 1962, Ser. No. 196,274
4 Claims. (Cl. 167—65)

This invention relates to a novel composition of matter and to a process for the preparation thereof, and is particularly directed to the novel compound porfiramine and to a process for producing the same.

Porfiromycin is a biosynthetic product produced by the controlled fermentation of a heretofore unknown species of an actinomycete, *Streptomyces ardus*, NRRL 2817. Various methods for the production, recovery and purification of porfiromycin are described in the published literature, e.g., C. De Boer et al., Antimicrobial Agents Annual, p. 17, 1960; R. R. Herr et al., Antimicrobial Agents Annual, p. 23, 1960. Porfiromycin is characterized by dark purple triclinic crystals which melt with decomposition at 201.5° C.; a molecular weight of about 344; a characteristic infrared absorption spectrum in mineral oil suspension at the following frequencies: 3370, 3250, 3150, 3000, 1720, 1690, 1640, 1600, 1555, 1535, 1440, 1403, 1390, 1365, 1342, 1320, 1245, 1215, 1160, 1135, 1098, 1065, 1045, 1028, 1008, 975, 952, 918, 890, 848, 808, 782, 758, 729, 718, 692, and 675 cm.$^{-1}$; slightly soluble in water, moderately soluble in polar organic solvents, and essentially insoluble in hydrocarbon solvents.

It has now been found that a novel compound according to this invention is obtained by hydrolytic cleavage of porfiromycin with a strong base. This new compound has been given the trivial name porfiramine. For example, on treating porfiromycin with aqueous sodium hydroxide suitably, at a concentration of one normal or greater, there is produced the novel compound of the invention, porfiramine. Hydrolytic cleavage of porfiromycin can also be effected by contacting porfiromycin with other strong bases, i.e., bases which are essentially completely disassociated, such as, alkali metal hydroxides and quaternary ammonium hydroxides, for example, potassium hydroxide, lithium hydroxide, tetramethylammonium hydroxide and strongly basic anion exchange resins. [Suitable anion exchange resins for this purpose are obtained by chloromethylating by the procedures given on pages 88 and 97 of Kunin, Ion Exchange Resins, 2nd ed. (1958), John Wiley and Sons, Inc., polystyrene cross-linked, if desired, with divinylbenzene prepared by the procedure given on page 84 of Kunin, supra, and quaternizing with trimethylamine, or dimethylalkanolamine by the procedure given on page 97 of Kunin, supra. Anion exchange resins of this type are marketed under the trade names Dowex 2, Dowex 20, Amberlite IRA-400, Duolite A-102, and Permutit S-1.]

The novel compound of the invention, porfiramine, has antibacterial activity as shown by the following table.

| Test Organism (in brain heart broth) | Minimum Inhibitory Concentration (MIC)[1] (at 42 hrs.) |
|---|---|
| *Klebsiella pneumoniae* | 50 |
| *Staphylococcus aureus* | 50 |
| *Diplococcus pneumoniae* | 25 |

[1] As mcg./ml.

The novel compound of the invention, porfiramine is useful as a disinfectant on various dental and medical equipment contaminated with *Staphylococcus aureus*; it can also be used as a disinfectant on washed and stacked food utensils contaminated with this organism. Porfiramine is active against *Klebsiella pneumoniae* and can be used for treating used cutting oils contaminated with this organism.

The following examples are illustrative of the process and products of the present invention, but are not to be construed as limiting.

EXAMPLE 1

*Porfiramine*

One gram of well-ground porfiromycin was treated with 10 ml. of 2 N sodium hydroxide and the mixture mulled in a mortar for 15 min. After standing for one hour at room temperature, the porfiramine crystals that had separated from the mixture were collected and washed thoroughly with water; yield 140 mg. The deep blue rod-like crystals turned brick red on drying in vacuo and blue again upon exposure to the air. Two recrystallizations from dimethyl formamide-water gave porfiramine crystals having an optical rotation $[\alpha]_{430} = -170° \pm 30°$ (c., 0.105 in ethanol); a characteristic infrared absorption spectrum in mineral oil mull at the following frequencies and as shown in FIGURE 1 of the accompanying drawing (the mineral oil is represented by the upper curve): 3580, 3400, 3310, 3260, 3200, 1713, 1668 (sh), 1615, 1602, 1575, 1510, 1346, 1295, 1205, 1103, 1085, 1050, 900, 870, 805, 790, 750, 720 cm.$^{-1}$; a characteristic UV spectrum as follows.

UV max. (mµ) in .01 N NaOH:
    251 ($a=81.5$)
    316 ($a=52.3$)
    350 (sh) ($a=20.5$)
UV max. (mµ) in .01 N H$_2$SO$_4$
    252 ($a=78.5$)
    311 ($a=50.0$)
    350 (sh) ($a=19.0$)

of which the latter (in acid) is shown in FIGURE 2 of the accompanying drawing, and the following elemental analysis.

Calculated for C$_{15}$H$_{18}$N$_4$O$_4$: C, 56.59; H, 5.70; N, 17.60; O, 20.10. Found: C, 57.22, 56.75; H, 5.73, 5.49; N, 17.20; O, 20.6.

Calculated molecular weight: 318.3. Found: 326 (titration in water pKa=7).

The crystalline porfiramine loses birefringence at 200° C. but doesn't melt below 340° C.

Higher or lower concentrations of the strong base can be used. At lower concentrations, however, less hydrolytic cleavage is obtained so that the process is less efficient and the porfiramine is more difficult to isolate. Therefore, it is generally desirable to keep the concentration of the strong base at least at about one normal. Any higher concentration practically obtainable can be used. For example, excellent results have been obtained using thirty percent aqueous potassium hydroxide.

I claim:

1. A composition of matter, porfiramine, which
   (*a*) is effective in inhibiting the growth of Gram-positive and Gram-negative bacteria;
and in its essentially pure crystalline form
   (*b*) has an optical rotation $[\alpha]_{430} = -170° \pm 30°$ (c., 0.105) in ethanol;

(c) has a characteristic infrared absorption spectrum as shown in FIGURE 1 of the accompanying drawing;
(d) has a characteristic ultraviolet absorption spectrum as shown in FIGURE 2 of the accompanying drawing;
(e) has the following elemental analysis: C, 57.22, 56.75; H, 5.73, 5.49; N, 17.20; O, 20.6; and
(f) has an observed molecular weight of 326.

2. A process for effecting hydrolytic cleavage of porfiromycin to porfiramine which comprises hydrolyzing porfiromycin with a strong base and recovering the porfiramine thus formed.

3. A process for producing porfiramine which comprises hydrolyzing porfiromycin with a strong base at a concentration of at least about one normal.

4. A process for producing porfiramine which comprises hydrolyzing porfiromycin with an aqueous solution of an alkali metal hydroxide at a concentration of at least about one normal.

References Cited in the file of this patent
Antimicrobial Agents Annual, 1960, pp. 17 and 23.